(12) United States Patent
Lukas et al.

(10) Patent No.: US 8,059,281 B2
(45) Date of Patent: Nov. 15, 2011

(54) DEVICE FOR MEASURING DISTANCE AND METHOD FOR OPERATING SAID TYPE OF DEVICE

(75) Inventors: Heiner Lukas, Stuttgart (DE); Wolfgang Adamczak, Stuttgart (DE); Steffen Tiede, Herrenberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/079,109

(22) Filed: Apr. 4, 2011

(65) Prior Publication Data

US 2011/0176389 A1 Jul. 21, 2011

Related U.S. Application Data

(62) Division of application No. 12/278,081, filed on Aug. 1, 2008, now Pat. No. 7,948,641.

(30) Foreign Application Priority Data

Mar. 24, 2006 (DE) .......................... 10 2006 013 707

(51) Int. Cl.
*G01B 11/14* (2006.01)

(52) U.S. Cl. ....................................................... 356/622
(58) Field of Classification Search ................... 356/622
See application file for complete search history.

(56) References Cited

U.S. PATENT DOCUMENTS 6,828,780 B2 * 12/2004 Jagiella et al. ........... 324/207.16
* cited by examiner

*Primary Examiner* — Roy M Punnoose
(74) *Attorney, Agent, or Firm* — Michael J. Striker

(57) ABSTRACT

A hand-held device (10, 10') for contactless distance measurement measures a distance (d) between a target object (18) and at least one reference point (20) of the device (10) using an emitted modulated measurement signal (16). The device includes a housing (12, 13, 56) with a first end (34) that faces the object (18) to be measured, and a second end (35) facing away from the object (18) to be measured. The housing includes an output unit (22, 28, 29, 31) for depicting measured results. Several measured distance values are to be assigned to at least one subsection of the path between the object (18) to be measured and the opposite end (35) of the housing (12, 13, 56) via a length-measurement scale (36, 38, 54) that is displayable in the output unit (22, 28, 29, 31).

10 Claims, 6 Drawing Sheets

DEVICE FOR MEASURING DISTANCE AND METHOD FOR OPERATING SAID TYPE OF DEVICE

CROSS REFERENCE

The present application is a divisional application of application Ser. No. 12/278,081, filed Aug. 1, 2008 now U.S. Pat. No. 7,948,641.

BACKGROUND OF THE INVENTION

The present invention relates to a device for measuring distance, in particular for contactless distance measurement, with which a distance between a target object and at least one reference point of the device may be determined, using an emitted measurement signal. The present invention also relates to the operation of a device of this type, in particular a method for operating a digital meter rule.

In the determination of distances, a distinction in made between a direct measurement by making a direct comparison of a distance with a measurement means, e.g., a ruler, a tape-measure, or a folding rule, and by performing an indirect measurement using contactless, e.g., electro-optical distance-measuring devices. Electro-optical distance-measuring devices make it possible to determine distances using transit time or phase measurements of a measurement signal.

The indirect distance-measuring devices on the market are designed nearly exclusively as measuring devices for determining a distance value, and not as auxiliary devices for use to perform actions associated with measurement, e.g., determining and marking points or lines.

Publication EP 15 666 58 A1 makes known a hand-held device for measuring distances that emits transmission beams via optics located in a housing toward the background region of an object to be measured, and then collects the reflected beams. This device also includes a component that is connected with the housing, which may be extended beyond the housing in order to measure short distances in the direction of propagation of the transmission beams. One embodiment of this device provides a component that serves as a spacer and extends beyond the housing by a fixedly predetermined length. The fixedly predetermined length of this spacer is at least as great as the critical distance in front of the housing of the measuring device within which it is not possible to carry out optical measurements on surface areas.

SUMMARY OF THE INVENTION

The inventive device for measuring distance, with which a distance between a target object and at least one reference point of the device may be determined in a contactless manner, using an emitted measurement signal, in particular a modulated measurement signal, includes a housing with a first end that faces the object to be measured, and a second end, which faces away from the object to be measured. The device also includes an output unit for depicting measured results. Advantageously, at least one subsection of the distance between the object to be measured and the opposite end of the housing is displayable using a length-measurement scale via the output unit of the device. This means that a length-measurement scale and, therefore, distance values, in particular a large number of distance values, may be assigned to at least one subsection of the distance between the object to be measured and the opposite end of the housing of the device via the output unit.

The inventive device therefore makes it possible to determine a single quantitative distance value and to display it—as is possible, e.g., with devices according to the related art—and to depict an entire length-measurement scale that displays a finite range of the distance to be measured, and/or the distance between the object to be measured and the end of the measuring device that faces away from the object.

In this manner, the inventive device serves as a meter rule, in particular a digital meter rule, with a measurement scale, in particular a length-measurement scale, which is displayable in the output unit of the device, in particular graphically, and which may display the distance values across an entire subsection of the section that was measured.

A user of the inventive device is therefore advantageously informed of a specific distance value between the device and an object to be measured, and he has—as with a device for measuring distances directly—a measurement scale that depicts the particular distance to the object to be measured, across a range having a finite length.

When operating a device of this type, the function of which corresponds to that of a digital meter rule, the zero point of the measurement scale of the meter rule, which is located outside of the measurement range depicted in the output unit of the device, is determined via a contactless distance measurement, in particular, e.g., via an electro-optical distance measurement. With a method of this type, it is advantageously possible, using a meter rule of finite length, e.g., typically from 0.3 to 1 meter, to measure significantly greater distances, i.e., several meters in length, while simultaneously displaying an entire range of distances and relative distances, as is the case, e.g., with a classical folding rule for a limited measuring range.

In particular, the length-measurement scale, which is reproduced using the output unit, may be depicted in a variable manner such that it changes as this measurement distance between the device and a target object increases and/or decreases, in accordance with the distance measured between the device and the object to be measured.

The measurement scale of the inventive device advantageously includes scale divisions and/or numerical values. It is particularly advantageous when the measurement scale includes numerical values, which represent the particular distance between the associated scale division and the measurement object, so that the measurement scale becomes a length-measurement scale. When the distance between the device and a measurement object varies, the scale divisions and/or the numerical values assigned to the scale divisions are varied accordingly, and they are communicated to a user in their updated form via the output unit of the device.

This scale adjustment may take place, e.g., automatically, as soon as the device operates in a fixed measurement mode and measures the distance continually.

This is made possible, e.g., by the fact that a computer unit integrated in the device determines the distance between a reference point of the device and the object to be measured and, based on this distance, generates a length-measurement scale across at least one subsection of the longitudinal extension of the measuring device, which may be displayed via the output unit of the measuring device.

The housing of the inventive device advantageously includes a lay edge, which is essentially parallel to the direction of the measurement signal used for contactless distance measurement. This lay edge advantageously forms a ruler, which may be used to draw lines and paths, in particular for drawing straight lines from the lay edge onto a surface. To draw the lines, the inventive device and/or a lay edge of the device that serves as a ruler is placed on certain points of the drawing surface, then the lay edge of the edge is traced, e.g., with a pencil. The shape of the edge is thereby transferred to the background as a line.

Advantageously, with the inventive device, the output unit for displaying the measurement scale is located essentially parallel, i.e., within the framework of production-related tolerances, to a lay edge of the housing. This makes it possible to directly transfer measurement points that may be read off using the measurement scale to a background, e.g., a wall, a ceiling, or the floor of a housing or a building. Given that the inventive device displays not just one measured value, but rather graphically depicts an entire measurement range with intermediate scale values, it is possible to transfer several dimensions and/or distances and, in particular, relative distances, based on just one device position, without the need to change the position of the distance-measuring device. In particular, a lay edge that is parallel to a measurement signal direction makes it possible to also transfer longer and, in particular, straight lines or paths to the background. The housing of the device—with its parallel sides—therefore advantageously serves as a ruler. Since the inventive device determines not only a single distance value, but rather an entire range of distance values, which may be in the magnitude, e.g., of 30 cm, it is not required, in particular, to position the measuring device exactly in the direction of the measurement signal.

In contrast to devices of the related art, with which, e.g., in the fixed measurement mode of the distance-measuring device, the device must be moved into a desired distance position using a very steady hand and a great deal of time, in order to mark off a measure or to draw a marking, the inventive measuring device saves handling time, since the relative distance in the direction of the measurement signal of the device may be fixed exactly across a relatively large measurement range using the measurement scale that is displayed. It need only be ensured that the end point of the path that was measured falls within the range that is depictable on the display.

In contrast to classical rulers, which have been known for a long time for use to measure distances directly, the inventive device provides a measurement range that is not limited to the length of the ruler. With the inventive device, the measurement range is limited by the measurement range of the contactless distance measurement. This measurement range that is accessible via contactless distance measurement may range from a few centimeters to more than 100 meters.

Advantageously, the orientation of the measurement scale that is depictable via the output unit of the measuring device may be switched relative to the housing. For example, the display of numerical values may be rotated by 180° depending on the orientation of the inventive device. This ensures that the measurement scale of the inventive measuring device is much easier to see, and enhances its user-friendliness. To realize this, a position sensor or tilt sensor may be integrated in the inventive device.

The housing of the inventive device advantageously includes an additional scale, e.g., a fixed scale with marks, which is formed, in particular, in the region of the lay edge of the housing. A second scale of this type that is formed on the housing makes it possible to easily transfer and mark off measurement points and paths on a background. The variable, electronic measurement scale, which may be displayed in the output unit, advantageously corresponds with the fixed mechanical scale on the housing of the device.

In an advantageous embodiment of the inventive device, the measurement signal that is used for contactless distance measurement is an electromagnetic measurement signal, e.g., a light signal or a radar signal. In a particularly advantageous manner, a modulated laser signal is suitable for use here, with which a contactless distance measurement may be carried out in a known manner, e.g., using a transit time measurement or a phase measurement of the signal.

In alternative embodiments of the inventive device, an acoustic signal, e.g., an ultrasonic signal, may also be used for contactless distance measurement.

The inventive device for contactless distance measurement combines the advantages of indirect and direct length measurement. Distances that may be measured and/or marked off only by using a ruler or a conventional meter rule—in a laborious manner, if at all—may now be easily ascertained and characterized. For example, paths that are several meters long may also be determined as a "one-man operation", due to the compact design of the inventive device. The process of transferring a measure from the measuring device, e.g., to a background is simplified and greatly accelerated, since the device need not be positioned at an exact point in the direction of the distance to be measured.

Further advantages of the inventive device and/or of an inventive method for operating a device of this type result from the description, below, of an exemplary embodiment.

BRIEF DESCRIPTION OF THE DRAWINGS

Exemplary embodiments of an inventive device are depicted in the drawing and are described in greater detail in the description below. The figures in the drawing, their descriptions, and the claims contain numerous features in combination. One skilled in the art will also consider the features individually and combine them to form further reasonable combinations. In particular, features of different exemplary embodiments may be combined to form further reasonable combinations.

DETAILED DESCRIPTION OF THE PREFERRED EMBODIMENTS

Figure 1:
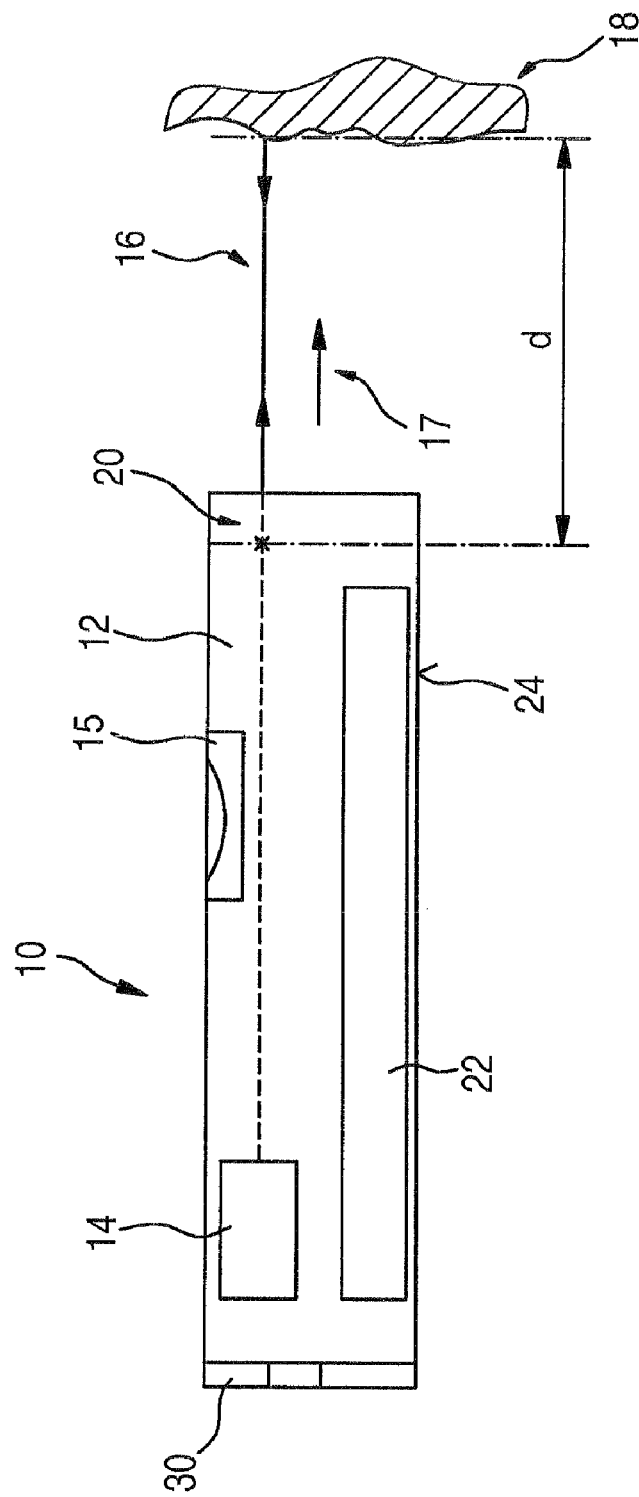
FIG. 1 shows an inventive device for contactless distance measurement, in a schematic overview depiction.

FIG. 1 shows a schematic overview of an inventive device for distance measurement. Device 10 includes a housing 12, inside of which electronic components for signal generation, signal detection, and signal evaluation are located. These electronic components are labeled as a group and symbolically with reference numeral 14 in the schematic depiction in FIG. 1. In addition to these electronic elements, the interior of the housing may include optical elements—depending on the embodiment—such as collimation lenses or objectives. Mechanical elements, e.g., mechanical connections, may also be located inside housing 12. The device also includes all known components of a distance-measuring device, in particular an electro-optical distance-measuring device. For orienting the device in a specific manner, the device includes a tilt sensor 15, which is depicted symbolically as a mechanical vial in FIG. 1. It may also be an electronic tilt sensor or the like.

The inventive device emits a measurement signal 16 in measurement signal direction 17, measurement signal 16 being reflected or scattered on a target object 18, so that a portion of the emitted, returning measurement signal 16 reaches housing 12 of device 10 once more and may be sensed using a not-shown detector of electronic components 14. The distance d between target object 18 and measuring device 10, in particular the distance between target object 18 and a reference point or a reference plane 20 of the device, may be detected in a known manner via a transit time measurement of measurement signal 16, or via a phase measurement, which evaluates, e.g., the relative phase shift between the measurement signal traveling to target object 18 and the measurement signal that was reflected on the target object and is returning to the measuring device.

A measuring device of this type may be realized, e.g., as a laser distance-measuring device, an ultrasonic measuring device, or a radar distance-measuring device by integrating appropriate sensors and receivers and the associated signal control and evaluation in housing 12 of measuring device 10. Within the framework of the description of the inventive device, reference is made to publications DE 102 32 878 A1 and DE 198 11 550 A1 for a more detailed explanation of the mode of operation of a device of this type for measuring distance. Those publications describe a basic possible mode of operation of a distance-measuring device of this type, which is designed as a laser distance-measuring device. Reference is therefore simply made thereto with regard for signal generation and evaluation.

The inventive device for measuring distance also includes an output unit 22, in particular an optical output unit 28, with which the results of a distance measurement may be displayed. Using output unit 22 it is also possible to depict a measured value that was determined using tilt sensor 15.

Housing 12 of device 10 includes a lay edge 24, which extends essentially—i.e., within the framework of the production tolerances—parallel to output unit 22.

The output unit itself, which is designed as an optical output unit, may be designed as an electro-optical display and has an extension in measurement signal direction 17 that is much greater than its extension in the direction orthogonal thereto. In preferred embodiments, the extension of output unit 22 in measurement signal direction 17 is many times greater than the extension in the direction perpendicular thereto. The extension may be, e.g., 10 to 30 cm, while the extension in the direction orthogonal thereto may be only 2 to 5 cm, for instance.

Figure 2:
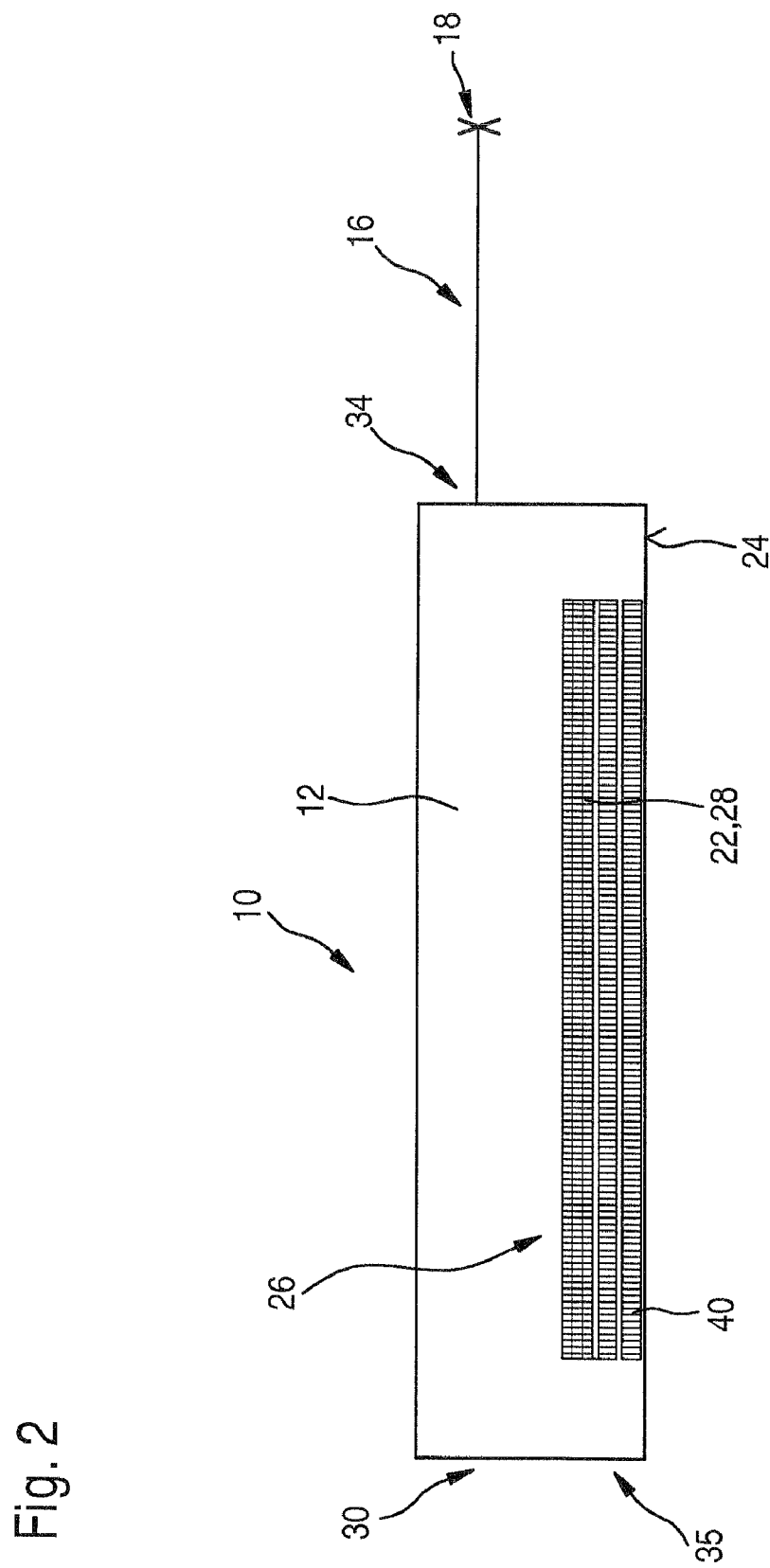
FIG. 2 shows an exemplary embodiment of an inventive device.

FIG. 2 shows an exemplary embodiment of an inventive device. Housing 12, which is essentially rectangular and is made, e.g., of a plastic or a light metal, e.g., aluminum, includes a housing opening 26, through which optical display 28 of output unit 22 is visible. Display 28 is oriented essentially parallel to the direction of measurement signal 16 and parallel to lay edge 24 of housing 12 of the device. Display 28, which serves as output unit 22, extends along a considerable portion of the longitudinal extension of the measuring device in the direction of measurement signal 16. Display 28 is located close to lay edge 24 of housing 12 of measuring device 10.

After the device is switched on using operating elements 30, which are not shown explicitly in FIG. 2, a linear scale 36, for instance, with discrete scale divisions is depicted directly in display 28 of output unit 22 across the entire longitudinal extension of output unit 22. The reference point for this length-measurement scale is then, reasonably, end 35—opposite to the outlet window—of housing 12, which is the left end of the housing shown in the view of the output unit in FIG. 2. In this operating mode, inventive device 10 serves as a classical ruler or meter rule, but with an, e.g., digital, electro-optical depiction of the scale values. In a mode of this type, the inventive device may be used like a normal meter rule for performing direct measurements. Advantageously, it is also possible to switch between different measurement systems, such as the common metric system used in Europe, and the U.S. inch system.

If, in addition, measurement signal 16, in particular an optical measurement signal, is activated using a related operating element 30, the distance to housing edge 34 is no longer displayed, but, instead, the distance between measuring device 10 and a target object 18 is displayed. To this end, distance d between target object 18 and a reference plane and/or a reference point 20 of the inventive device is determined, e.g., using the known phase-measurement method and, based on the distance to reference point 20 of the device, a related length-measurement scale 36 is then computer-generated in output unit 22, so that it depicts the distances between the scale divisions of this measurement scale to the target object. In this operating mode of the inventive device, distances between the measuring device and a target object may be depicted across the entire range depicted in display 28. If, e.g., the distance between a target object 18 and the reference point and/or reference plane 20 of the measuring device are/is changed, the length-measurement scale of the measuring device is automatically updated, so that it depicts the distance between individual scale divisions and measurement object 18 exactly and in an up-to-date manner, so that at least one subsection of the distance between an object 18 to be measured and end 35 of housing 12 facing away from the object is displayed using length-measurement scale 36 via output unit 22 of the device.

The inventive measuring device is therefore equivalent to a meter rule, in particular a digital meter rule, whose zero point of the measurement scale is located outside of the measurement scale displayed in output unit 22. When measurement signal 16 is activated, the zero point of this measurement scale may also be located, in particular, clearly outside of the housing of the device.

In alternative embodiments, measurement signal 16 may also be activated directly when the measuring device is switched on, so that the measuring device immediately finds itself in the second, contactless measurement mode described above. The device may operate, e.g., in a fixed measurement mode, in which the current distance between the device and the particular target object or reference point is measured in an uninterrupted manner or with a special clock rate, and is depicted in the display.

In an alternative manner, a further measurement mode of the inventive device may provide only a single measurement, which is initiated, e.g., when an operating element is actuated. In accordance with the distance to the target object that is measured, the depiction of the scale on the output unit is shown, e.g., in a single image.

With the inventive measuring device, it is also possible, e.g., to record a single measured value in a single measurement, and to store it in the device using a "memory function". This stored or "tapped" value may now be transferred easily to another background using the inventive device. In the "memory mode", the output unit indicates, e.g., using arrows, in which direction the device should be slid so that the distance that is currently being measured corresponds to the distance that was previously recorded. If the end point of the distance to be marked off is located within the range of the measurement scale, this end point is displayed in the corresponding point in the output unit, so that a user may mark off the measure that was previously determined. In this manner it is possible to transfer a measurement that was recorded or "tapped" once to a large number of backgrounds. For instance, a large number of boards may be marked off with the same measurement, so that they may then be cut. As an alternative, it is also possible to not measure or "tap" the measured value to be marked off, but rather to first enter it directly in the measuring device via a keypad with digits, and to store it there. In the "memory mode", the output unit of the device indicates, e.g., using arrows that point to the left or right, in which direction the device should be slid so that the distance that is currently being measured corresponds to the distance value that was previously recorded.

Figure 3:
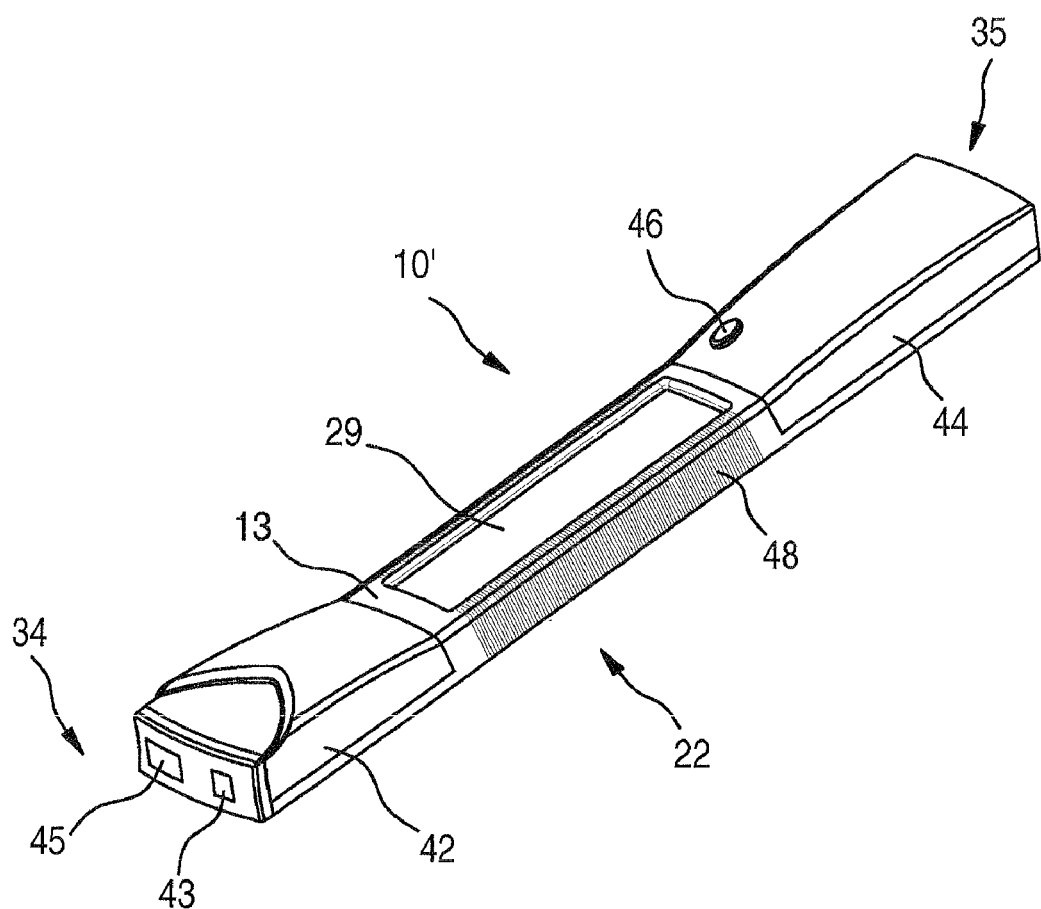
FIG. 3 shows an alternative exemplary embodiment of an inventive device, in a perspective overview illustration.

FIG. 3 shows an alternative embodiment 10' of an inventive measuring device. The device includes a housing 13 with a measurement head 42, in which, e.g., a laser distance-measuring device or an ultrasonic distance-measuring device is located. The measurement signal passes through an outlet window 43 located on end 34 of the device facing the object and exits housing 13, and is reflected on a target object which is not shown in FIG. 3. A portion of the measurement signal returns to the housing via inlet window 45. An evaluation and computer unit 44 of the device is located on end 35 of the device that is opposite to measurement head 42 and therefore faces away from the object, which determines the distance between the device and the target object, e.g., via a transit time measurement or a phase evaluation. Related operating elements and input buttons, for example, may also be provided in the region of evaluation unit 44, which are depicted symbolically as a single operating element 46 in the illustration shown in FIG. 3. Output unit 22—in the form of an electro-optical display 29—is located between measurement head 42 and computer unit 44. The device includes a fixed scale 48 on both longitudinal sides of electro-optical display 29, fixed scale 48 being installed on housing 13 of the device. These scales are used to transfer measured values to a background. In alternative embodiments of the inventive device, the measurement head and the evaluation and computer unit may also be integrated in a housing, and they may be located, in particular, on only one side of the display.

This mode of operation of the device and, in particular, the mode of operation of the output unit correspond to those described above, and they will be described in greater detail below with reference to the exemplary embodiments shown in FIGS. 2 and 3.

Figure 4:
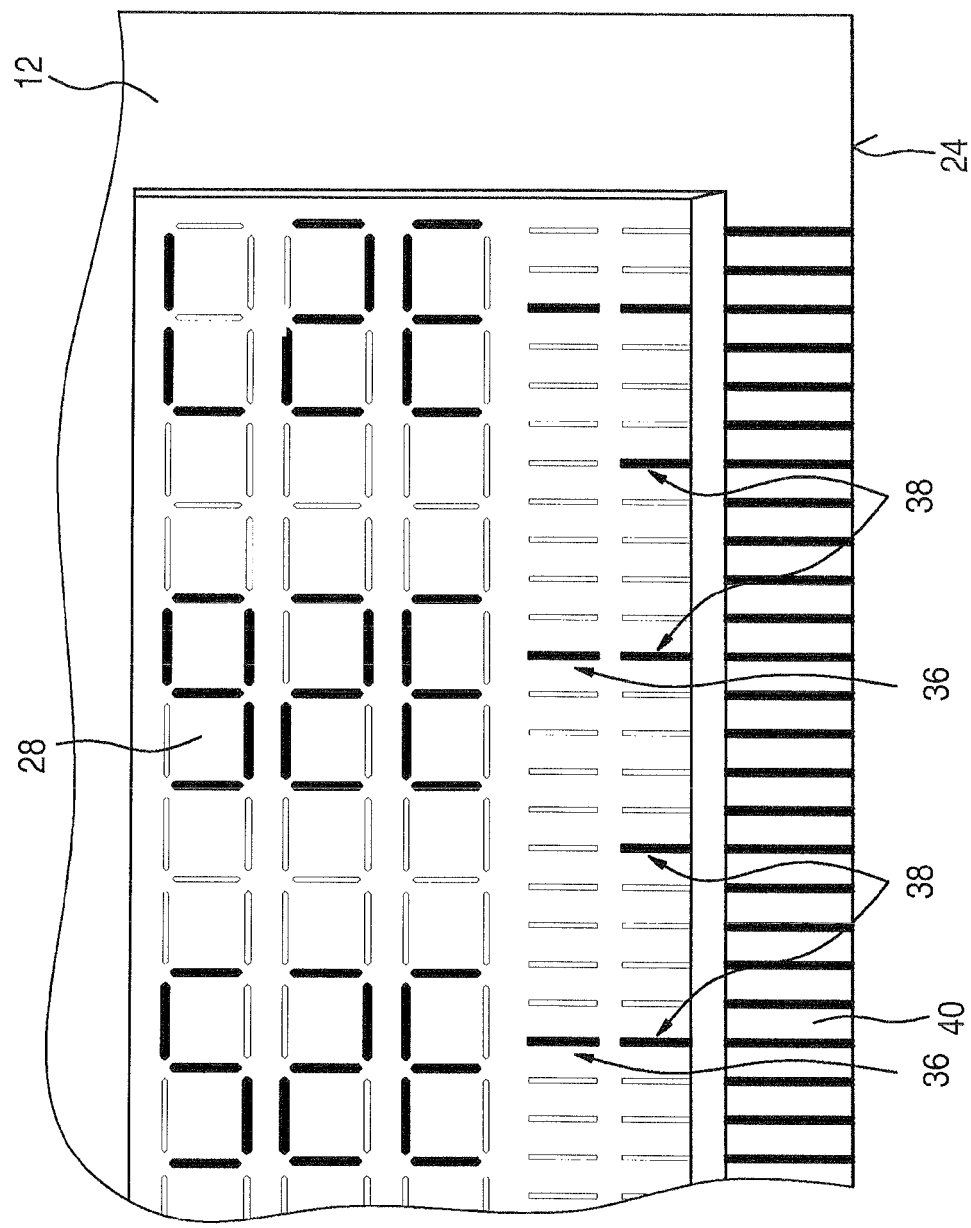
FIG. 4 shows a detailed view of an output unit of the inventive device according to an embodiment shown in FIG. 2 or FIG. 3.

FIG. 4 shows a detailed view of housing 12 and 13 of inventive device 10 and 10' according to FIG. 2 and FIG. 3, respectively, in the region of optical display 28 and 29, respectively. The display is a digital display with a variable scale that is composed of scale marks and assigned numerical values. The numerical values change as the distance between the measuring device and a target object increases or decreases. It is also possible, in principle, to use, e.g., LEDs or laser displays. Scale divisions 36 of 1 cm are shown in exemplary display 28 and 29. This scale is subdivided further into 5 mm-increments by additional scale divisions 38. A further subdivision, e.g., into 1 mm-increments, is also possible, and may be displayed in the output unit, e.g., if so prompted by the user. An embodiment of the inventive device may also be advantageous with which the scale may be divided into more or fewer increments, depending on the absolute distance from a target object that is measured. For example, the measurement uncertainty of the inventive device may be adapted to the absolute distance between the device and the target object, as was proposed by the applicant in DE 102 32 878 A1 for distance-measuring devices. In accordance with the measurement uncertainty applied, it is therefore possible to display the measurement scale with different resolutions.

Numerical values are assigned to scale divisions 36, which represent the distance from each scale division 36 to a target object 18. The inventive device therefore displays the distance between a target object and a reference plane or a reference point of the measuring device, and it displays the absolute distances between a measurement scale and the target object, within a finite range. The absolute distance between measurement points and a target object, and, therefore, the relative distance between these measurement points, may be read out across the entire range of the output unit, and they may be marked off, e.g., on a background. To this end, housing 12 of inventive device 10 also includes a fixed scale division 40, i.e., it is fixed relative to the housing, which is located, e.g., across the entire longitudinal extension of output unit 22 and/or across the entire longitudinal extension of housing 12, and which is fixed to housing 12. A fixed scale division of this type with 1 mm-increments is used in the exemplary embodiment shown in FIG. 2 and in FIG. 3. Other scale divisions are also feasible, of course.

In addition to the embodiment of the electronic length-measurement scale shown in FIG. 4, depending on the application, it is also possible to depict only a portion of the entire measurement range, or to depict only a single measured value, thereby making it possible—as with conventional laser distance-measuring devices—to also perform individual measurements, e.g., relative to a reference point or a reference edge of the device (e.g., the front or rear end of the measuring device). In particular, it is provided that the reference point—on the device—for the distance measurement may be switched.

Figure 5:
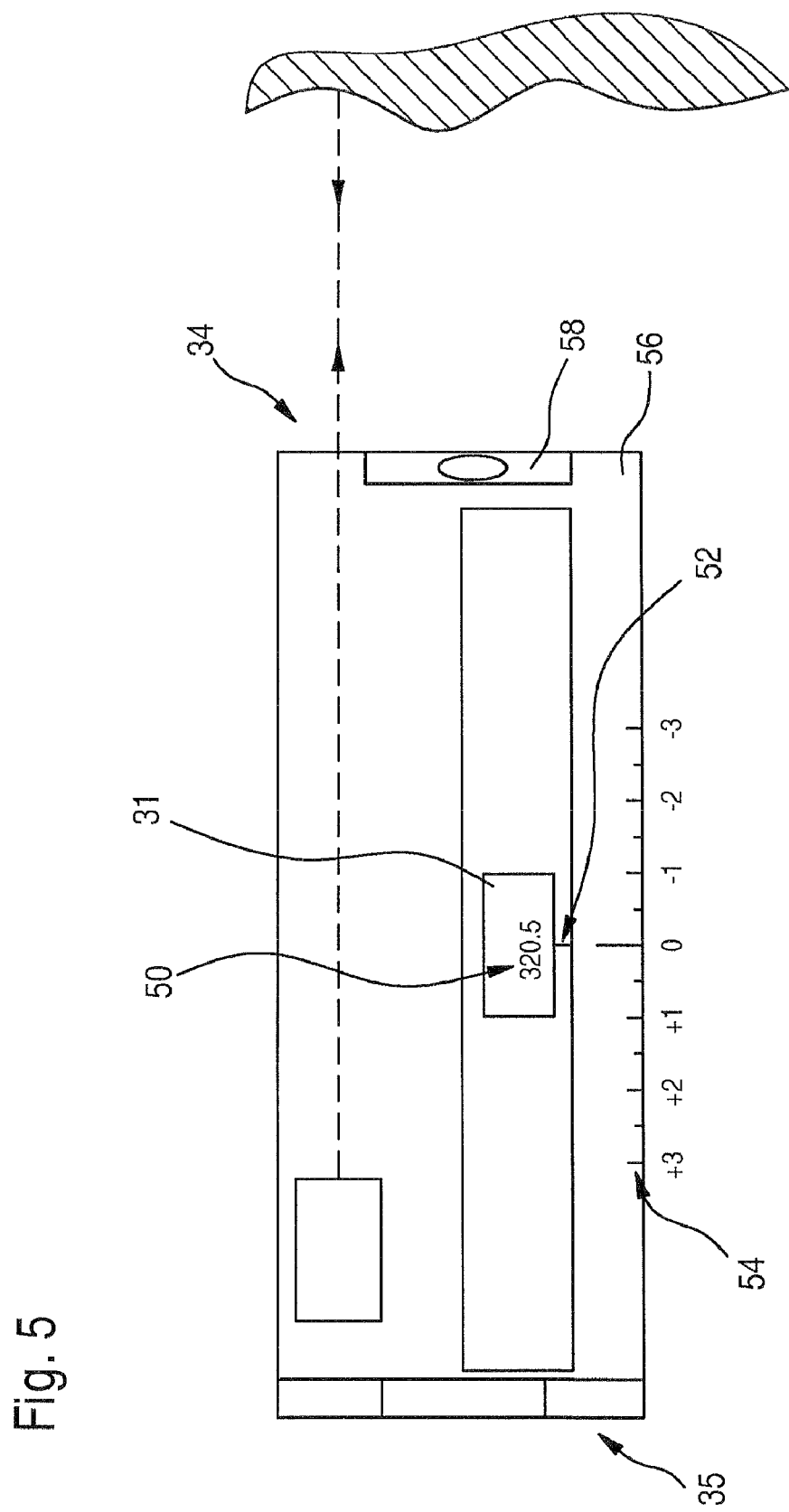
FIG. 5 shows a schematic illustration of an alternative output unit for an inventive device.

FIG. 5 shows a greatly simplified version of an exemplary embodiment of an output unit of this type. A single measured value 50 (320.5 cm in this case) is advantageously provided with at least one scale mark 52, with which—via its relation to fixed measurement scale 54 on device housing 56—the measured value itself or relative lengths may be marked off, based on measured value 50, which was measured in a contactless manner. To this end, fixed measurement scale 54 of housing 56 is advantageously designed as a relative scale, and measured value 50, which was determined in a contactless manner, is displayed in a fixed position in output unit 31. To orient the device, a mechanical vial 58 is integrated in housing 56, on end 34 of the device that faces the object. As an alternative, an electronic tilt sensor may also be integrated in the device shown in FIG. 5 or in the other, previously described devices. The position and placement of the vials or the inclinometer may vary, depending on the embodiment.

A user may select the different measurement modes using related operating elements, based on the task at hand. The measurement modes may be selected, e.g., using a keypad, or a rotating wheel on the housing.

It is possible, e.g., in a special measurement mode of each of the embodiments of the inventive device described above, to store a measured value using a "memory button", or to enter a desired distance value directly in the measuring device using a button sequence. When this stored value is marked off, e.g., on a different background, the numerical value may be emphasized separately in the display. This may take place, e.g., in a display of the output unit as shown in FIG. 5. When the desired value is marked off, e.g., an arrow or a line is displayed, which indicates the position of the measured value to be marked off based on the position of the output unit relative to the target object. The user of the inventive device is therefore informed about which direction he should slide the device in order for it to be located the desired distance away from a certain target object. When the measured value to be marked off appears in the display of the device, i.e., when the end point of the distance to be marked off is located within the range of the length-measurement scale displayed in the output unit, the arrow or line is hidden and the measured value is displayed at the point that represents its distance from the reference point. In this manner, a user is easily informed about which direction he should move the inventive device relative to the target object in order to come within the range of the desired distance.

It is advantageous in particular to also provide the inventive device with a mechanical or electronic vial that makes it possible to also use the inventive device as an inclinometer, and to ensure that the device is level when a distance measurement is carried out using the device.

In addition, by integrating a position sensor in the housing of the inventive device, the output unit may be designed such that the distance values that are displayed are always displayed in a position that is easiest to read. For example, depending on the orientation of the housing, the numerical value, which is assigned to a scale division, may be rotated, e.g., by 90° or 180° relative to the orientation shown in FIG. 3, to ensure that a user is able to easily read the scale. The digital scale of the output unit therefore provides the user with good orientation across the entire measurement range and, in particular, across the display range of the device.

Figure 6:
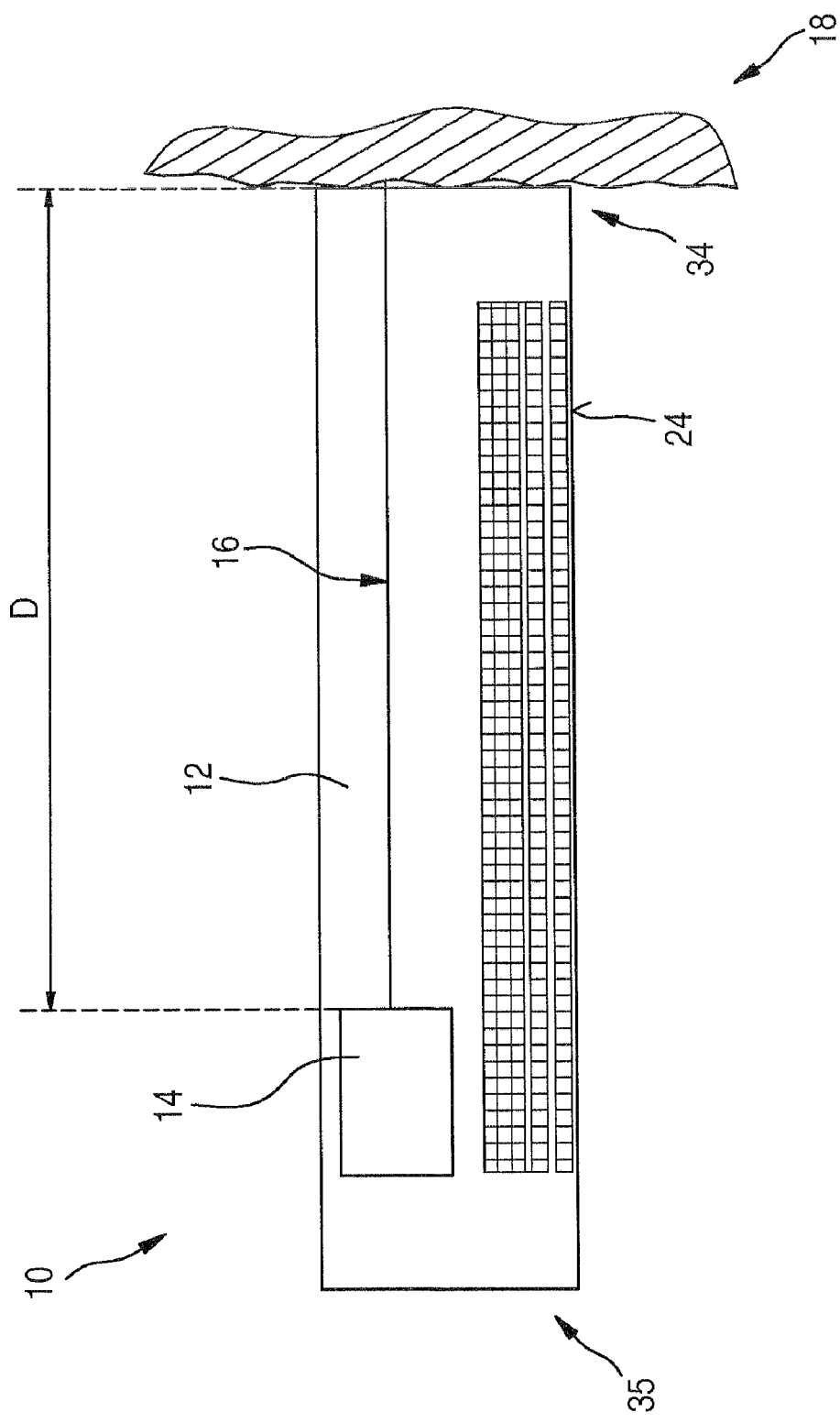
FIG. 6 shows the use of the inventive device for measuring very short distances.

In contrast to conventional electro-optical distance-measuring devices, it is also advantageously possible to measure and/or mark off values starting at a distance of 0 mm from the device. FIG. 6 shows a measurement situation of this type.

By locating the measurement components, i.e., in particular the transmitter and receiver for the measurement signal, in the housing of the device, it is possible to avoid the "dead zone" in the close range of object distances, which is a few centimeters and which is common with distance-measuring devices, e.g., laser distance-measuring devices. This is possible, in particular, with the inventive device given that measurement components 14 are set back in "linear housing" 12 of the device by at least a distance D, which is equal to the length of the dead zone. With the inventive device, it is therefore possible to even perform measurements relative to target objects that are located at a distance of zero or only a few centimeters away from the end—near the object—of the housing of the device. Positioning the device relative to the target object, which may also require that the device and target object be in contact with each other, is also considered to be a contactless distance measurement within the scope of the inventive disclosure, however, since the determination of the particular distance between the measuring device and the target object takes place in a contactless manner using measurement signal 16.

The inventive device is not limited to the designs presented in the exemplary embodiments.

In particular, the inventive method is not limited to the use of light signals, in particular laser signals, as the measurement signal. It is also possible, e.g., to use radar signals or electromagnetic signals in general as the measurement signal to determine a distance between a target object and the device and/or a reference point of the device.

As an alternative, it is also possible to use acoustic measurement signals, in particular ultrasonic signals, for these distance measurements.

In addition to the use of modulated measurement signals, with which distance may be measured based on the signal transit time and/or the phase displacement of the measurement signal, which travels back and forth, it is also basically possible to use triangulation methods to determine the distance between the target object and the measuring device.

The output unit is not limited to the use of an electro-optical display. It is possible, e.g., to depict the measurement scale purely mechanically by displaying a rotating strip on which the measured distance values are shown.

The inventive device is therefore equivalent to a meter rule, in particular a digital meter rule, which combines the advantages of direct and indirect length measurement. In particular, the advantageous housing design, which has an increased longitudinal extension of the housing in the direction of the measurement that is considerably greater than the extension of the housing in both directions orthogonal thereto, makes it possible to perform measurement-related actions, e.g., determining and marking off points, distances between points, or lines. The longitudinal display—which is digital—designed in this manner makes it possible to depict a variable scale composed of scale marks and numerical values, which may change, in particular, as the measurement distance increases or decreases, and which are adapted to the related distance values. In particular, it is now possible for a single user to determine and characterize distances that previously required a great deal of effort to measure or mark off using a ruler or a conventional, finite meter rule. When lines are marked off, the functionality of the inventive device therefore advantageously corresponds to that of a conventional ruler.

It will be understood that each of the elements described above, or two or more together, may also find a useful application in other types of constructions differing from the types described above.

While the invention has been illustrated and described as a device for measuring distance and method for operating said type of device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A method for operating a finite-length digital meter rule of finite length having an optical output unit for depicting a length-measurement scale, comprising the following steps:
    positioning a zero point of the length-measurement scale outside of a measurement range displayed in the optical output unit; and
    determining the zero point via an electro-optical distance measurement.

2. The method as recited claim 1, wherein the measurement scale of the meter rule changes as a distance between the meter rule and a measurement object changes, in accordance with a particular distance.

3. The method as recited in 2, wherein the output unit depicts the measurement scale with numerical values, wherein each of said numerical values represents a distance between a scale division associated with the numerical value and the measurement object.

4. The method as recited in claim 2, further comprising determining a distance between a target object and at least one reference point of the digital meter rule using an emitted modulated measurement signal, wherein the measurement signal is an optical measurement signal which is a laser signal.

5. The method as recited in claim 2, further comprising determining a distance between a target object and at least one reference point of the digital meter rule using an emitted modulated measurement signal, wherein the measurement signal is an acoustic signal, which is an ultrasonic signal.

6. The method as recited in claim 1, wherein the output unit is an electro-optical display with which the length-measurement scale is displayable in digital form.

7. The method as recited in claim 1, wherein the measurement scale is composed of scale divisions and/or numerical values.

8. The method as recited in claim 1, wherein the measurement scale has a switchable orientation relative to a housing of said digital meter rule.

9. The method as recited in claim 1, further comprising providing at least one tilt sensor formed as a vial selected from the group consisting of at least one mechanical vial and electronic vial, which enables the meter rule to be used as an inclinometer.

10. The method as recited in claim 1, further comprising determining a distance between a target object and at least one reference point of the digital meter rule using an emitted modulated measurement signal, wherein the measurement signal is an electromagnetic measurement signal, which is a modulated electromagnetic measurement signal.

* * * * *